United States Patent
Nakajima

[11] Patent Number: 6,151,821
[45] Date of Patent: Nov. 28, 2000

[54] ROAD SIGN

[76] Inventor: Kenichi Nakajima, 11-20 Kotobukicho, Ashikaga-shi, Tochiga-ken, Japan

[21] Appl. No.: 09/018,178

[22] Filed: Feb. 3, 1998

[30] Foreign Application Priority Data

Feb. 21, 1997 [JP] Japan ................................... 9-037636
Sep. 18, 1997 [JP] Japan ................................... 9-253326

[51] Int. Cl.⁷ .................................................. G09F 13/02
[52] U.S. Cl. ................................................. 40/612; 40/560
[58] Field of Search .............................. 40/612, 615, 561, 40/560, 559

[56] References Cited

U.S. PATENT DOCUMENTS

| | | | |
|---|---|---|---|
| 1,756,203 | 4/1930 | Lindsey | 40/561 |
| 1,764,639 | 6/1930 | Nathansohn | 40/561 |
| 1,807,403 | 5/1931 | Gordon | 40/561 |
| 1,811,594 | 6/1931 | Powers | 40/561 |
| 1,831,532 | 11/1931 | Harris | 40/561 |
| 3,553,869 | 1/1971 | Dickinson | 40/559 |
| 3,994,086 | 11/1976 | Mizuochi | 40/615 X |
| 4,082,426 | 4/1978 | Brown | 40/615 X |
| 4,726,134 | 2/1988 | Woltman | 40/615 X |
| 4,846,549 | 7/1989 | Gutsche | 40/561 X |
| 5,442,870 | 8/1995 | Kochanowski | 40/612 X |

FOREIGN PATENT DOCUMENTS

| | | | |
|---|---|---|---|
| 0 677 833 | 10/1995 | European Pat. Off. . | |
| 646114 | 11/1928 | France | 40/561 |
| 698685 | 2/1931 | France | 40/561 |
| 482101 | 9/1929 | Germany | 40/561 |
| 08050210 | 2/1996 | Japan . | |
| 294084 | 7/1928 | United Kingdom | 40/561 |

*Primary Examiner*—Joanne Silbermann
*Attorney, Agent, or Firm*—Oblon, Spivak, McClelland, Maier & Neustadt, P.C.

[57] ABSTRACT

A road sign includes an installation portion provided with a lighting window, a sign display portion that includes a sign member that uses light to display a prescribed sign, and a light-guide structure that guides light entering the lighting window to the sign member to display the sign by reflecting or transmitting the light. The road sign configuration renders the sign clearly visible even when the light comes from car headlights on a low-beam setting.

3 Claims, 8 Drawing Sheets

ROAD SIGN

BACKGROUND OF THE INVENTION

1. Field of the Invention

The present invention relates to a road sign located at the side of a road or in the center of a road whereby even when the headlights of a car, for example, are on low beam, the low-beam light renders a prescribed sign visible to people passing by, especially drivers.

2. Description of the Prior Art

Road signs are generally provided at the side of a road to provide people using the road with advance warning that care is required with respect to the shape of the road ahead or that some facility lies ahead.

To enable such a road sign to be visible even at a distance and at night, the road sign is usually set at a height of two meters from the road surface and is constituted to reflect light. Thus, when a car is travelling along the road at night with headlights on high beam, the headlights on high beam are reflected by the road sign, rendering the prescribed sign visible to the driver. However, since high beams dazzle drivers of oncoming cars, drivers usually drive with headlights switched to the low-beam setting. As road signs are set high off the ground, this means that at night not enough light is reflected by a road sign to make the sign sufficiently visible.

SUMMARY OF THE INVENTION

An object of the present invention is therefore to provide a road sign that is rendered clearly visible to a driver even by light that is close to the road surface, such as when the headlights of a car are on low beam.

In accordance with present invention, the above object is attained by a road sign, comprising an installation portion provided with a lighting window, a sign display portion that includes a sign member that uses light to display a prescribed sign, and a light-guide structure that guides light entering via the lighting window to the sign member.

If the sign member is constituted of a material that transmits light, the structure used to guide the light to the sign member may be one that guides the light to the rear surface of the sign member to display the prescribed sign by transmission of the light therethrough.

In the same way, if the sign member is constituted of a material that reflects light, the structure used to guide the light to the sign member includes one that guides the light to the front surface of the sign member to display the prescribed sign by reflection of the light therefrom.

With the road sign thus constituted according to the present invention, the sign member is illuminated by light entering a lighting window that is positioned to receive mainly light from car headlights on low beam. Thus, even when a car travelling along the road is using the low beam setting, the sign is illuminated in the dark by the low-beam light, rendering the sign visible to the driver and thereby ensuring safety.

Further features of the invention, its nature and various advantages will be more apparent from the accompanying drawings and following detailed description of the invention.

DESCRIPTION OF THE PREFERRED EMBODIMENTS

Figure 1:
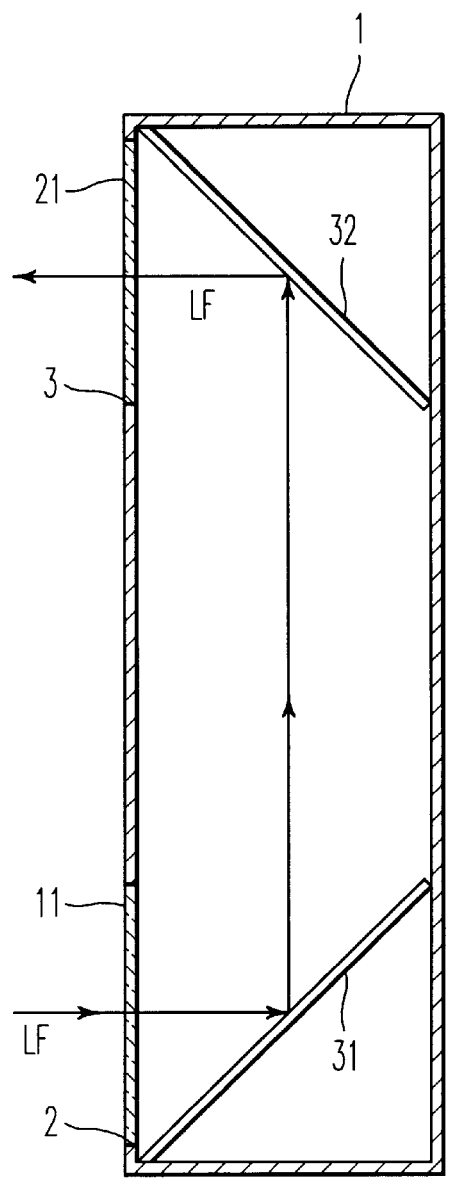
FIG. 1 is a cross-sectional view of a road sign according to a first embodiment of the present invention.
Figure 2:
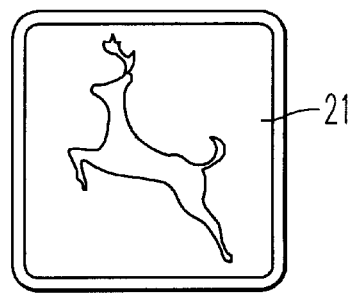
FIG. 2 is a front view of an example of the sign member used in the road sign of FIG. 1.

FIGS. 1 and 2 show a road sign that is a first embodiment of the present invention. In these drawings, reference numeral 1 denotes a vertically extended box member, 2 is a lighting window of a prescribed size provided at the lower front of the box member 1, and 3 is a light emission window of a prescribed size, provided at the upper front part, about two meters from the bottom edge. The lighting window 2 is covered by a cover 11 formed of a material that is transparent to light. Arranged in the light emission window 3 is a sign member 21 in the shape of a prescribed sign, such as that shown in FIG. 2, whereby the sign is displayed by light transmitted from the rear surface.

A reflector plate 31 is arranged at a prescribed angle inside the box member 1 at the lower end thereof, facing the cover 11. Similarly, a reflector plate 32 is arranged at a prescribed angle inside the box member 1 at the upper end thereof, facing the sign member 21. Light $L_F$ passing through the cover 11 is reflected upward onto the reflector plate 32 by the reflector plate 31, and is thus projected onto the rear surface of the sign member 21.

When a car travelling at night and using headlights on the low-beam setting is coming toward the front of the road sign located at the side of the road, the light $L_F$ from the headlights passes into the box member 1 via the cover 11 of the lighting window 2. The light $L_F$ is then guided to the rear surface of the sign member 21 by reflection by the reflector plate 31 and reflector plate 32, and passes through the sign member 21 to thereby exit from the box member 1 in the direction of the car, clearly displaying the sign.

Thus, in accordance with this first embodiment of the invention, light $L_F$ enters the lower part of the box member 1 via the cover 11 and is reflected by the reflector plate 31 and the reflector plate 32 to the rear surface of the transparent sign member 21 at the upper front part of the box member 1. As such, even if the car is travelling with its headlights on low beam, the sign is rendered clearly visible to the driver by the low-beam light $L_F$, ensuring safety.

Light reflected from the front surface of the sign member 21, although slight, can combine with the light $L_F$ transmitted by the sign member 21 to render the sign visible to the driver. When the car is travelling with its headlights on high beam, the light reflected by the front surface of the sign member 21 becomes the main component, with only a small portion of the light being the light $L_F$ transmitted by the sign member 21, again rendering the sign visible to the driver.

Figure 3:
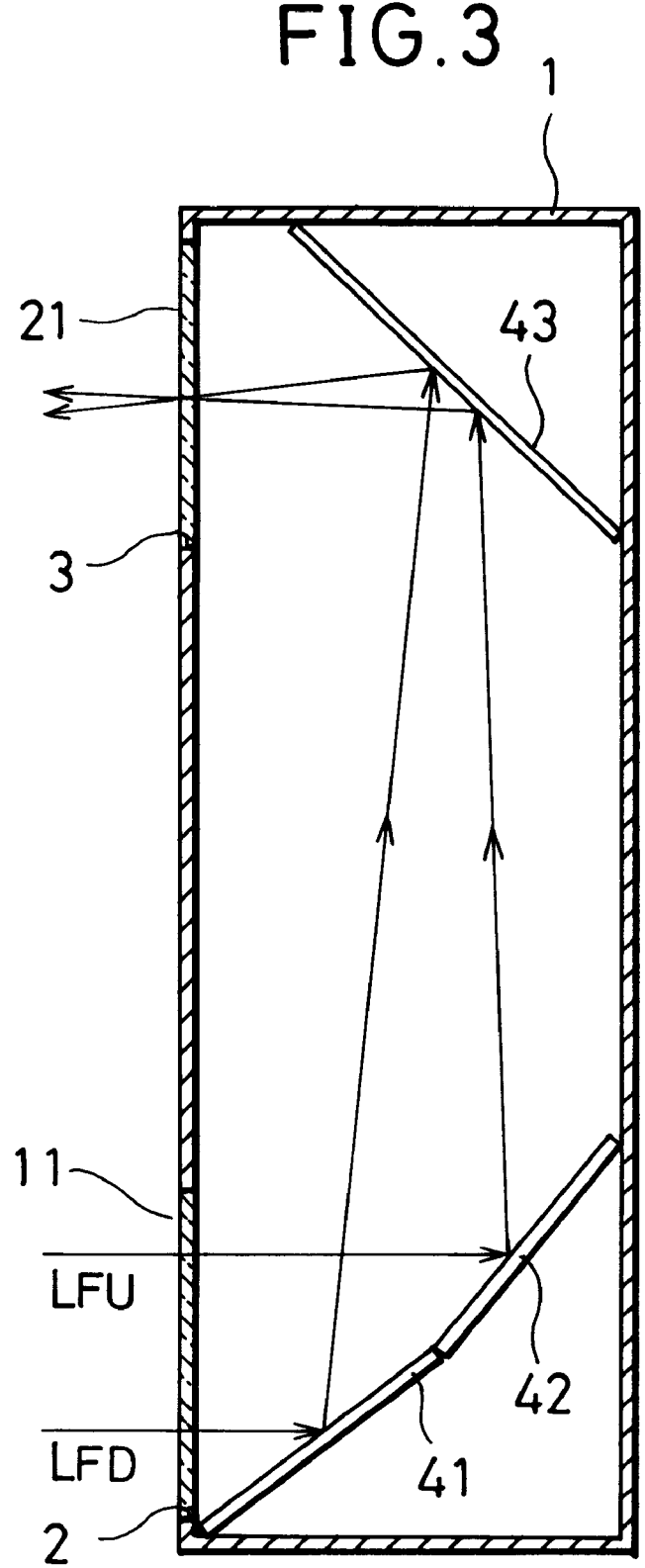
FIG. 3 is a cross-sectional view of a road sign according to a second embodiment of the present invention.

FIG. 3 shows a road sign according to a second embodiment of the present invention. Parts that are the same as or equivalent to parts in FIG. 1 and FIG. 2 have been given the same reference numerals, and further explanation thereof is omitted. In FIG. 3, reference numerals 41 and 42 denote reflector plates arranged in the lower interior part of the box member 1, and 43 denotes a reflector plate inside the box member 1 at the upper end thereof. Lower light $L_{FD}$ transmitted by the cover 11 is reflected onto the reflector plate 43 by the reflector plate 41, and upper light $L_{FU}$ transmitted by the cover 11 is reflected onto the reflector plate 43 by the reflector plate 42. The reflector plates 41 and 42 are set at mutually different angles relative to a vertical line to produce a partial or total overlap of light $L_{FD}$ and light $L_{FU}$ at the sign member 21 portion, with reflector plate 43 reflecting the light $L_{FD}$ and $L_{FU}$ from the reflector plates 41 and 42 to the rear surface of the sign member 21.

The operation of the arrangement of the second embodiment is the same as that of the first embodiment, so further explanation thereof is omitted. The same effect obtained with the first embodiment can be obtained with the second embodiment. In particular, the reflector plates 41 and 42 are angled to produce a partial or total overlap of light $L_{FD}$ and light $L_{FU}$ at the sign member 21 portion, enabling the sign portion of the sign member 21 to be brightly displayed, ensuring safety by rendering the sign even more visible to the driver.

Figure 4:
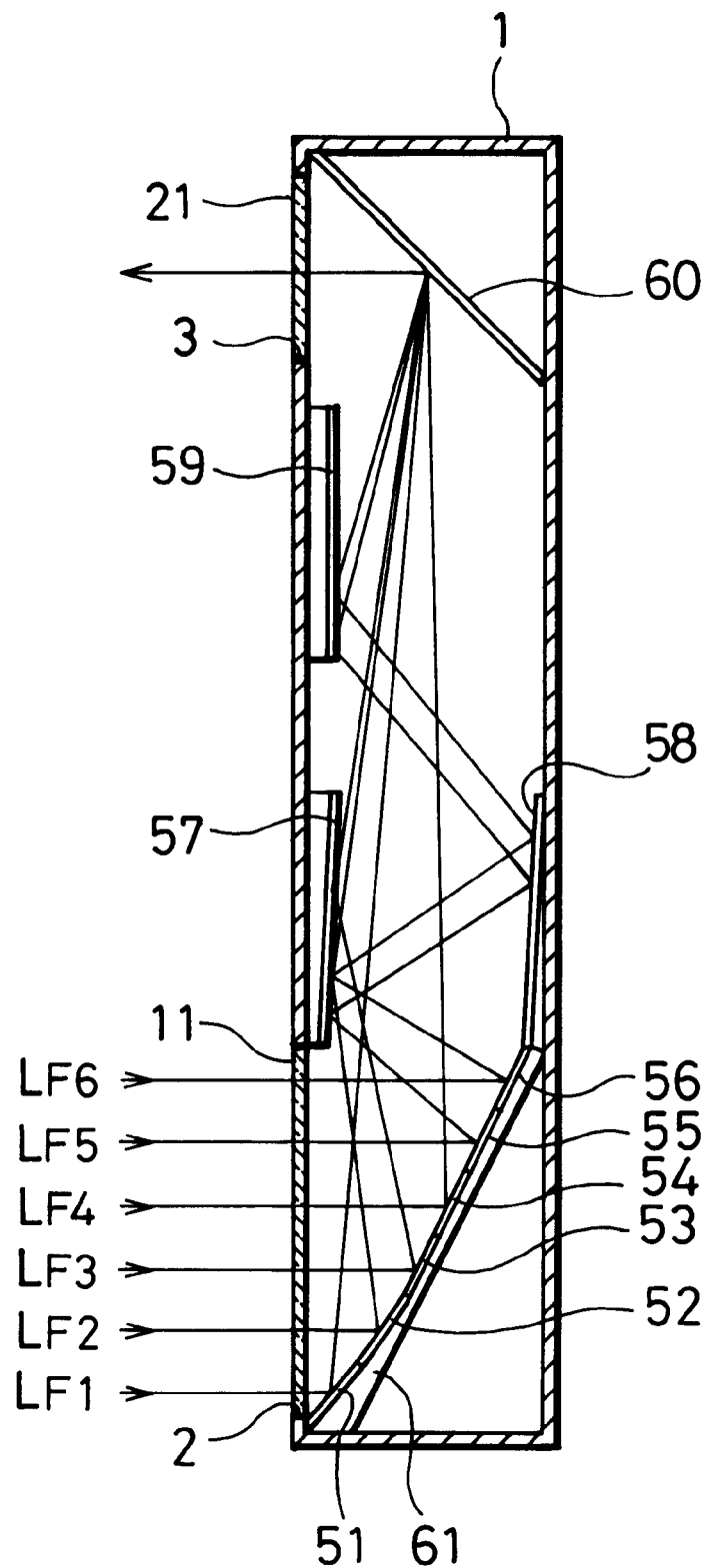
FIG. 4 is a cross-sectional view of a road sign according to a third embodiment of the present invention.

FIG. 4 shows a road sign according to a third embodiment of the present invention. Parts that are the same as or equivalent to parts in FIGS. 1 to 3 have been given the same reference numerals, and further explanation thereof is omitted. In FIG. 4, reference numerals 51 to 60 denote reflector plates arranged inside the box member 1. Vertically dividing light transmitted by the cover 11 into six, denoted by light $L_{F1}$ to light $L_{F6}$, with light $L_{F1}$ being the bottom most light and light $L_{F6}$ the topmost, reflector plate 51 reflects light $L_{F1}$ to reflector plate 60, reflector plate 52 reflects light $L_{F2}$ to reflector plate 57, reflector plate 53 reflects light $L_{F3}$ to reflector plate 57, reflector plate 54 reflects light $L_{F4}$ to reflector plate 60, reflector plate 55 reflects light $L_{F5}$ to reflector plate 57, and reflector plate 56 reflects light $L_{F6}$ to reflector plate 57. Reflector plate 57 reflects light $L_{F2}$ and light $L_{F3}$ from reflector plate 52 and reflector plate 53 to reflector plate 60 and light $L_{F5}$ and light $L_{F6}$ from reflector plates 55 and 56 to reflector plate 58; reflector plate 58 reflects light $L_{F5}$ and light $L_{F6}$ from reflector plate 57 to reflector plate 59; reflector plate 59 reflects light $L_{F5}$ and light $L_{F6}$ from reflector plate 58 to reflector plate 60; and reflector plate 60 reflects light $L_{F1}$ to light $L_{F6}$ from reflector plates 51, 54, 57 and 59 to the rear surface of the sign member 21 (light reflected by reflector plate 60 is shown as a single line).

A stand 61 supports each of the reflector plates 51 to 56 at a different angle whereby light $L_{F1}$ to light $L_{F6}$ partly or totally overlap at the sign member 21. Reflector plates 57 and 59 are disposed at the inner side of the front of the box member 1, reflector plate 58 is arranged at the inner side of the back of the box member 1, and reflector plate 60 is arranged in the box member 1 at the upper end thereof.

The operation of the arrangement of this third embodiment is the same as that of the first and second embodiments, so further explanation thereof is omitted. The same effect obtained with the first or second embodiment can be obtained with the third embodiment. Since the reflector plates 51 to 59 are angled to produce a partial or total overlap of light $L_{F1}$ to light $L_{F6}$ at the sign member 21 portion, the sign portion of the sign member 21 can be even more brightly displayed, ensuring safety by rendering the sign even more visible to the driver. This arrangement also allows the thickness of the box member 1 to be reduced.

Figure 5:
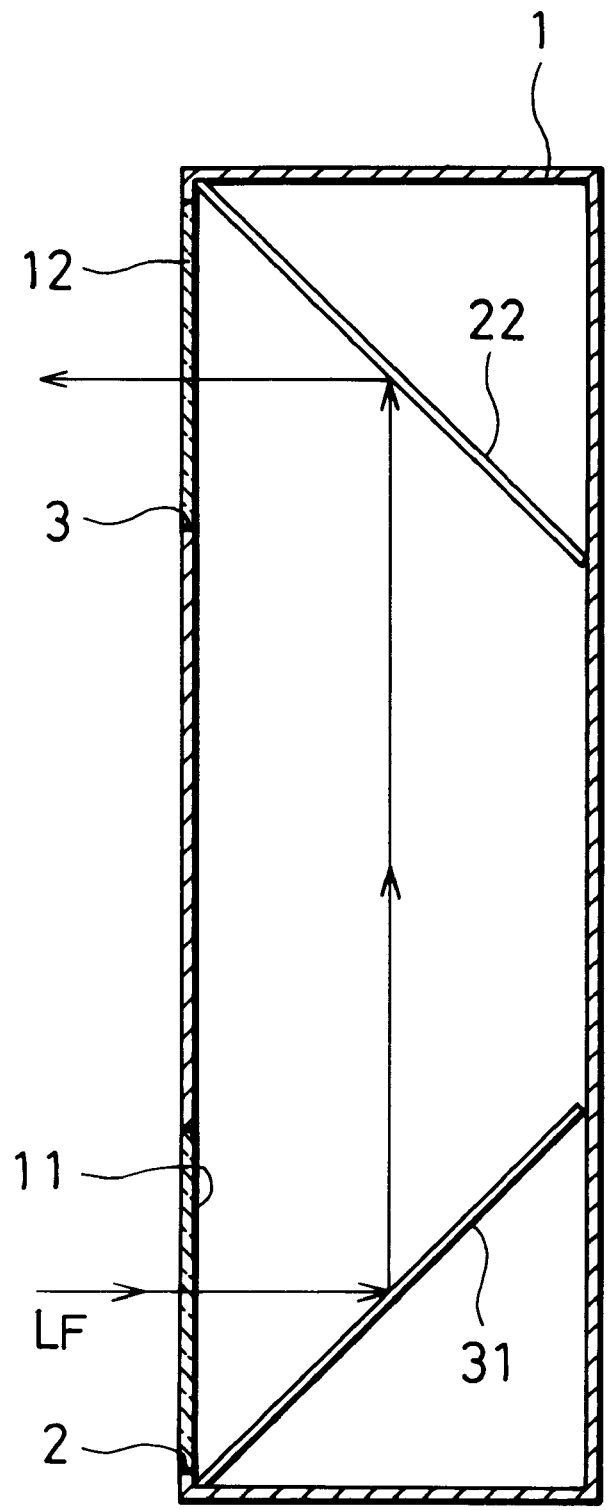
FIG. 5 is a cross-sectional view of a road sign according to a fourth embodiment of the present invention.

FIG. 5 shows a road sign according to a fourth embodiment of the present invention. Parts that are the same as or equivalent to parts in FIGS. 1 to 4 have been given the same reference numerals, and further explanation thereof is omitted. With reference to the arrangement of FIG. 5, the light emission window 3 is provided with a cover 12 that is formed of a material that is transparent to light. Reference numeral 22 denotes a sign member arranged to the rear of the light emission window 3, with the prescribed sign being located at a position that is above the lower edge of the light emission window 3 and the sign member 22 being arranged in the box member 1 at an angle that runs from the upper front part of the box member 1 down toward the back thereof to reflect light $L_F$ from the reflector plate 31 to display the prescribed sign.

When a car travelling at night and using headlights on the low-beam setting is coming toward the front of the road sign located at the side of the road, the light $L_F$ from the headlights passes into the box member 1 via the cover 11 of the lighting window 2. This light $L_F$ is then reflected onto the sign member 22 by the reflector plate 31, and is reflected by the sign member 22 through the cover 12 to thereby exit from the box member 1 in the direction of the car, drawing the driver's attention. This fourth embodiment provides the same effect as the first three embodiments.

Figure 6:
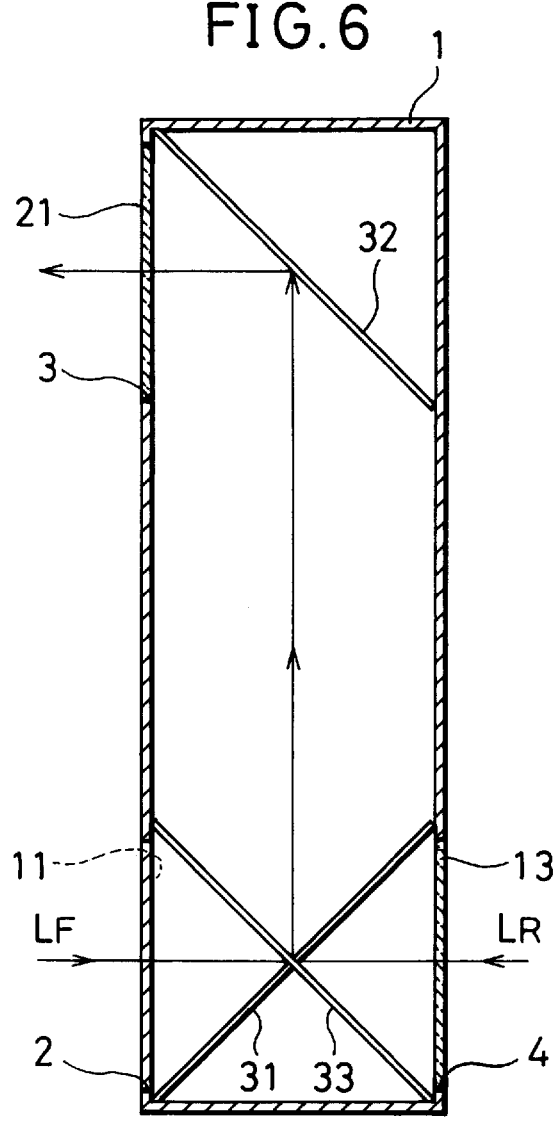
FIG. 6 is a cross-sectional view of a road sign according to a fifth embodiment of the present invention.
Figure 7:
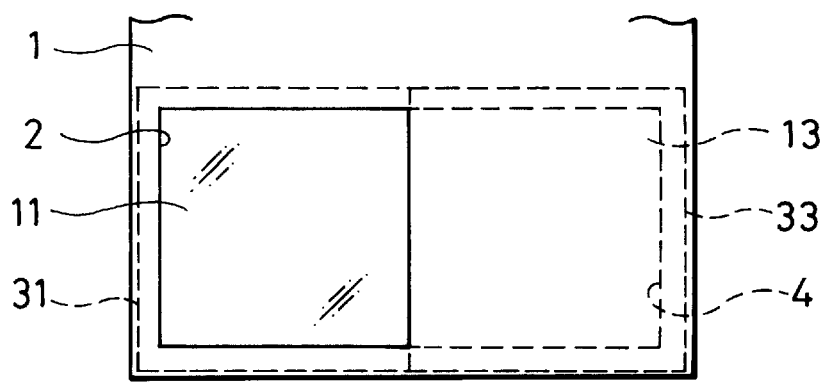
FIG. 7 is an enlarged view of the lower part of the box member of FIG. 6, seen from the front (that is, from the left side).
Figure 8:
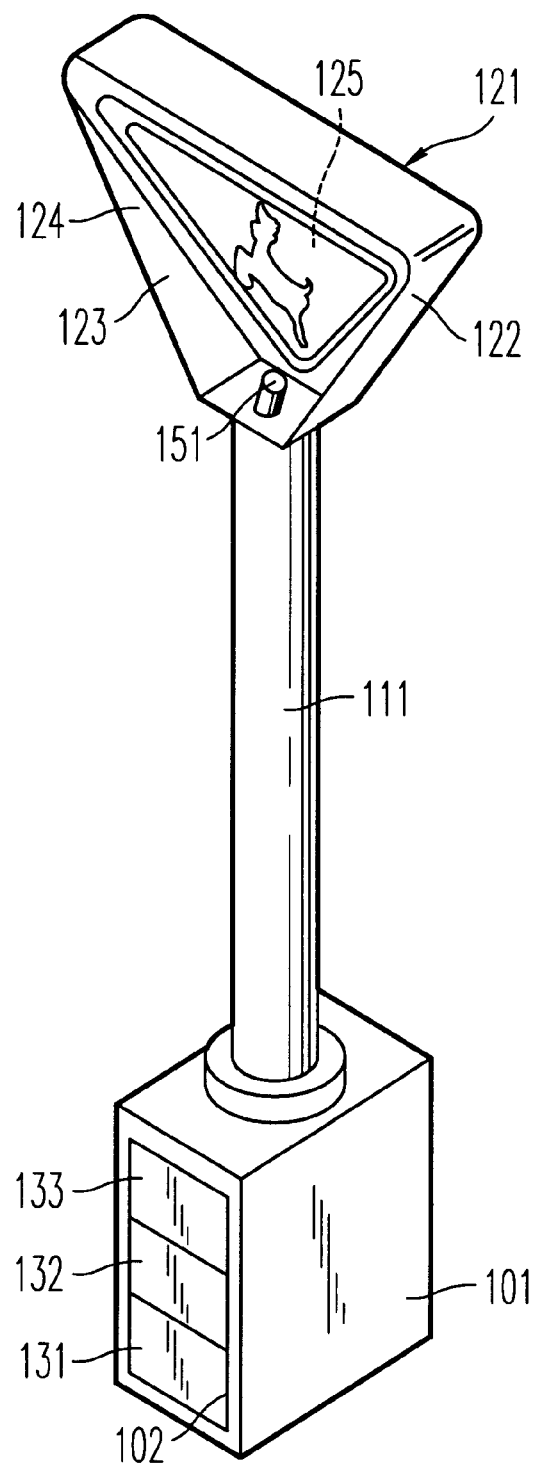
FIG. 8 is a cross-sectional view of a road sign according to a sixth embodiment of the present invention.
Figure 9:
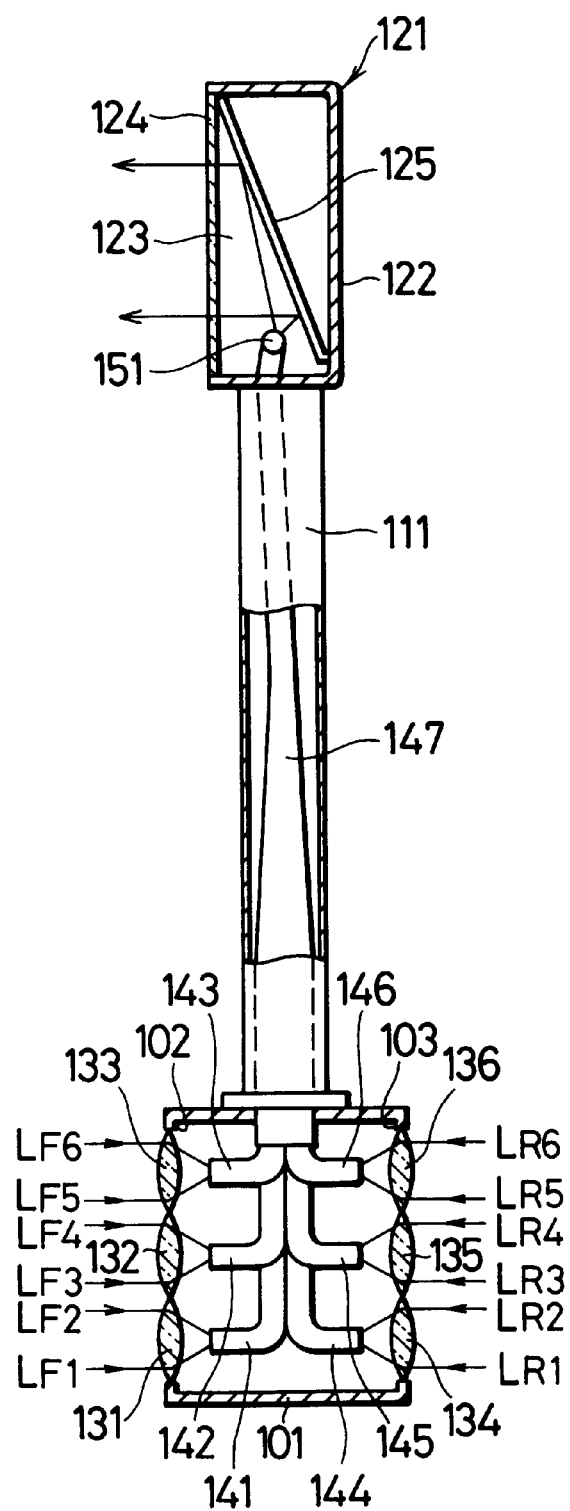
FIG. 9 is a cross-sectional, partially cutaway view of the road sign arrangement of FIG. 8.

FIGS. 6 and 7 show a road sign according to a fifth embodiment of the present invention. Parts that are the same as or equivalent to parts in FIGS. 1 to 5 have been given the same reference numerals, and further explanation thereof is omitted. In these drawings, reference numeral 4 denotes a lighting window of a prescribed size located at the lower part of the back of the box member 1 at a position that is horizontally offset with respect to the position of the lighting window 2 so that the lighting window 4 and lighting window 2 do not overlap. The lighting window 4 is provided with a transparent cover 13. Reference numeral 33 denotes a reflector plate arranged at the bottom end inside the box member 1 to reflect light $L_R$ transmitted by the cover 13 to reflector plate 32. The reflector plates 31 and 33 are horizontally offset so that they do not overlap, reflector plate 32 is arranged so that, vertically, half overlaps reflector plate 31 and half overlaps reflector plate 33, and reflector plates 31 and 33 are angled so that light $L_F$ and $L_R$ is reflected over the whole of reflector plate 32.

When a car travelling at night and using headlights on the low-beam setting is coming toward the front of the road sign located in the center of the road on a central dividing strip, the light $L_F$ from the headlights passes into the box member 1 via the cover 11 of the lighting window 2. This light $L_F$ is then guided to the rear of the sign member 21 by reflection by the reflector plates 31 and 32, and passes through the sign member 21 to thereby exit from the box member 1 in the direction of the car, drawing the driver's attention.

When a car using its low beams is coming toward the rear of the road sign, the light $L_R$ passes into the box member 1 via the cover 13. This light $L_R$ is then guided to the rear of the sign member 21 by reflection by the reflector plates 33 and 32, and passes through the sign member 21 to thereby exit from the box member 1 in the direction of the car. The fifth embodiment provides the same effect as the first four embodiments. Moreover, since the sign is also rendered visible by the light $L_R$ impinging on the lower rear portion of the box member 1, the sign can also be rendered visible by the low-beam light $L_R$ of cars travelling in the opposite lanes, and the sign can be brightly displayed to drivers on the front side by light $L_F$ and $L_R$ from cars going in both directions, ensuring safety by rendering the sign even more clearly visible.

FIGS. 8 to 11 show a sixth embodiment of the invention. In the drawings, the box member takes the form of an installation portion 101, the lower front of which is provided with a lighting window 102 of a prescribed size and the lower back of which is provided with a lighting window 103 of a prescribed size. The lower end of a cylindrical body 111 is affixed to the center of the top of the box member 101, and a sign display portion 121 is attached to the upper end of the cylindrical body 111. The sign display portion 121 is comprised of a light emission window 123 at the front, a sign box member 122 around the light emission window 123, a transparent cover 124, and a sign member 125 in the sign box member 122, the sign member 125 being arranged at an angle that runs from the upper front part of the sign box member 122 down toward the back thereof to reflect light toward the cover 124 to display the prescribed sign. An appropriate height from the box member 101 to the sign display portion 121 is around two meters.

Figure 10:
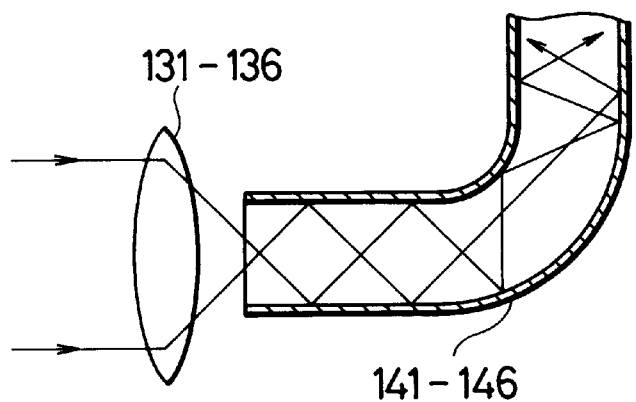
FIG. 10 illustrates a light-guide tube used in the road sign of FIG. 8.
Figure 11:
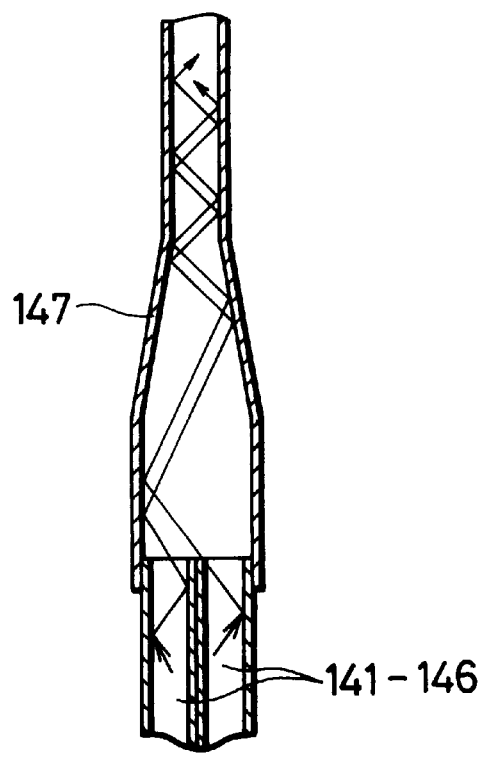
FIG. 11 illustrates the arrangement used to connect light-guide tubes in the road sign of FIG. 8.

Convex lighting lenses 131 to 133 are arranged at equal intervals in the lighting window 102 at the front as if to close the lighting window 102, and convex lighting lenses 134 to 136 are arranged at equal intervals in the lighting window 103 at the rear, as if to close the lighting window 103. Cylindrical light-guide tubes 141 to 146 are provided within the box member 101 with the open ends facing the lenses 131 to 146, respectively. As shown in FIG. 10, each of the light-guide tubes is bent into a prescribed shape and uses internal reflection to guide light $L_{F1}$ to light $L_{F6}$ and light $L_{R1}$ to light $L_{R6}$ from the lenses 131 to 136 to the other ends. Inside the cylindrical body 111 is a light-guide tube 147 that extends from the upper end of the box member 101 to the lower end of the sign box member 122, and, as shown by FIG. 11, uses internal reflection to guide light $L_{F1}$ to light $L_{F6}$ and light $L_{R1}$ to light $L_{R6}$ from the light-guide tubes 141 to 146 up to the top end. The top end of the light-guide tube 147 is provided with a lens 151 that magnifies the light $L_{F1}$ to light $L_{F6}$ and light $L_{R1}$ to light $L_{R6}$ supplied from the light-guide tube 147 and projects the light toward the sign member 125.

When a car travelling at night and using headlights on the low-beam setting is coming toward the front of this road sign located in the center of the road on a central dividing strip, light $L_{F1}$ to light $L_{F6}$ from the headlights impinges on the lenses 131 to 133 inside the box member 101, and after being guided by light-guide tubes 141 to 143 and light-guide tube 147, is projected from the lens 151 toward the sign member 125, which reflects the light through the cover 124 in the direction of cars to the front, drawing the drivers' attention.

Also, when a car using its low beams is coming toward the rear of the road sign, light $L_{R1}$ to light $L_{R6}$ from the headlights impinges on the lenses 134 to 136 inside the box member 101, and after being guided by light-guide tubes 144 to 146 and light-guide tube 147, is projected from the lens 151 toward the sign member 125, which reflects the light through the cover 124 in the direction of cars to the front of the sign. This sixth embodiment provides the same effect as the first five embodiments. Furthermore, since the light-guide structure is constituted by the lenses 131 to 136, light-guide tubes 141 to 147 and lens 151, the depth can be reduced.

In the first to fifth embodiments described above the lower part of the box member 1 forms the installation portion, the upper part of the box member 1 forms the sign display portion, and the major part of the box member 1 connecting the installation portion and the sign display portion is constituted by a cylindrical portion.

Also, the lighting windows 2 and 4 of the box member 1 are provided with covers 11 and 13 and the light emission window 3 is provided with cover 12, preventing the entry of dust and the like. However, the covers 11 to 13 may be dispensed with.

Moreover, as described in the third embodiment, the light coming from one direction can be divided vertically into six, and reflector plates, such as reflector plates 41 and 42 and 51 to 59, inclined at different angles relative to the vertical line so that part or all of the light overlaps at the sign member portion. However, the same effect can be obtained by horizontally dividing light coming from one direction and using a plurality of reflector plates disposed at different angles relative to a horizontal line so that some or all of the light overlaps at the sign member portion, or both arrangements can be combined to display the sign with even greater brightness.

Also, with reference to the sixth embodiment which describes providing a lens 151 at the end of the light-guide tube 147, same effect can be obtained with a lens 151 that is concave or convex. Moreover, provided the whole of the sign member 125 can be illuminated by the light, the same effect can be obtained even without the use of the lens 151. Furthermore, while the sign member 125 was described as being reflective, it can be one that transmits light, as in the case of the first embodiment. It is also possible to dispense with the light-guide tube 147 by providing the inside surface of the cylindrical body 111 with the reflecting function of the light-guide tube 147, or by extending the light-guide tubes 141 to 146 up to the top. The lenses 134 to 136 and light-guide tubes 144 to 146 can be dispensed with by using an arrangement that utilizes the light $L_{F1}$ to light $L_{F6}$ from the front.

While, also, the light-guide structure has been described as being constituted by reflector plates 31 to 33, or reflector plates 41 to 43, or reflector plates 51 to 60, or lenses 131 to 136, light-guide tubes 141 to 147 and lens 151, any other configuration may be used that enables light from the lighting window 2, 4, 102 or 103 to be guided to the sign member 21, 22 or 125. For example, light focused by lenses could be projected onto one end of a bundle of optical fibers and the light emerging from the other end of the optical fibers be diverged by a lens, or just optical fibers alone used to guide the light, in which case, as in the sixth embodiment, the depth of the arrangement could be reduced.

As described, the sign members 22 and 125 are light-reflecting members arranged at an angle. However, members can be used that are irregularly reflective and are arranged vertically. It is also to be understood that the sign member and light-guide structure can be combined. Moreover, while the sign member has been described with reference to the example of the display of picture signs, the display need not be of picture signs, but may be of character signs or signal signs having colors such as red or yellow.

As described in the foregoing, light entering through a lighting window provided on an installation portion is guided to the rear of a transparent sign member by a light-guide structure, or a light-guide structure is used to guide to the front of a sign member that reflects light, whereby even when a car travelling along the road is using the low-beam headlight setting, the sign is illuminated in the dark by the low-beam light, rendering the sign visible to the driver and thereby ensuring safety.

What is claimed is:

1. A road sign adapted to be visible when illuminated by the headlights of a car, comprising:

an installation provided with at least one window at a front portion thereof so as to be illuminated by the light;

a sign display portion that includes a sign member having a predetermined sign, said sign being located on said front portion of the installation; and a light-guide structure for guiding the light entering via the window to the sign member;

said sign member being transparent to the light and making the sign visible by the light passing through the sign and being guided by said light-guide structure towards said front portion of said installation.

2. The road sign according to claim 1, wherein the sign member is comprised of material that transmits light and the light-guide structure guides incident light to a rear of the sign member.

3. A road sign for being illuminated by light from the headlights of a car, comprising:

an installation provided with a lighting window at a front portion thereof so as to be illuminated with the light and pass therethrough and which includes a light emission window on the front portion;

a sign display portion that includes a sign member having a predetermined sign; and a light-guide structure that guides light entering via the lighting window to a rear of the sign member;

said sign member being transparent to the light and making the signal visible by the light passing through the sign and through said light emission window, the light being guided by the light guiding structure from the light window to the light emission window.

* * * * *

UNITED STATES PATENT AND TRADEMARK OFFICE
CERTIFICATE OF CORRECTION

| | | |
|---|---|---|
| PATENT NO. | : 6,151,821 | Page 1 of 1 |
| DATED | : November 28, 2000 | |
| INVENTOR(S) | : Kenichi Nakajima | |

It is certified that error appears in the above-identified patent and that said Letters Patent is hereby corrected as shown below:

<u>Title page,</u>
Item [75], the Inventor's residence is listed incorrectly, also the CPA information has been omitted. It should read as follows:

-- [75] Inventor: Kenichi Nakajima, 11-20 Kotobukicho, Ashikaga-shi, Tochigi-ken, JAPAN -- [45] **Date of Patent: *November 28, 2000**

-- [*] Notice: This Patent issued on a continued prosecution application filed under 37 CFR 1.53(d), and is subject to the twenty year patent term provisions of 35 U.S.C. 154(A)(2). --

Signed and Sealed this

Second Day of October, 2001

*Attest:*

NICHOLAS P. GODICI
*Attesting Officer*     *Acting Director of the United States Patent and Trademark Office*